(12) United States Patent
Bernhardt et al.

(10) Patent No.: US 7,434,961 B1
(45) Date of Patent: Oct. 14, 2008

(54) COVER DEVICE FOR COMPACT FLUORESCENT LAMPS

(75) Inventors: Gary Colin Bernhardt, East Hills, NY (US); Wojciech Pawelko, Deer Park, NY (US); Michael Fusco, Smithtown, NY (US); Michael A Savona, Coram, NY (US); Jonanthan Hacker, Deer Park, NY (US)

(73) Assignee: Adaptive Lighting Solutions LLC, Glen Cove, NY (US)

( * ) Notice: Subject to any disclaimer, the term of this patent is extended or adjusted under 35 U.S.C. 154(b) by 0 days.

(21) Appl. No.: 11/877,019

(22) Filed: Oct. 23, 2007

(51) Int. Cl.
 *F21V 14/00* (2006.01)

(52) U.S. Cl. ............... 362/255; 362/216; 362/260; 362/396; 362/452

(58) Field of Classification Search ........ 362/216, 362/255, 256, 260, 396, 438, 186, 440, 442, 362/452
 See application file for complete search history.

(56) References Cited

U.S. PATENT DOCUMENTS

| 2,534,955 | A | * | 12/1950 | Dazley | 362/216 |
| 2,963,574 | A | * | 12/1960 | Pfaff, Jr. | 362/216 |
| 4,785,384 | A | * | 11/1988 | Zwald et al. | 362/255 |
| 5,174,646 | A | * | 12/1992 | Siminovitch et al. | 362/218 |
| 5,523,931 | A | * | 6/1996 | Kassay et al. | 362/235 |
| 5,546,291 | A | | 8/1996 | Simes | |
| 5,980,068 | A | * | 11/1999 | Yu | 362/351 |
| 6,439,740 | B1 | * | 8/2002 | Yan | 362/216 |
| 2007/0014549 | A1 | | 1/2007 | Demarest et al. | |

* cited by examiner

*Primary Examiner*—Jong-Suk (James) Lee
*Assistant Examiner*—Julie A. Shallenberger
(74) *Attorney, Agent, or Firm*—Michael J. Porco; Gerald E. Hespos; Anthony J. Casella

(57) ABSTRACT

A device for enhancing the appearance of a compact fluorescent lamp (CFL) and changing the optical properties of light emitted by the CFL is provided. The device for a compact fluorescent lamp (CFL) includes a cover configured for obscuring the compact fluorescent lamp; and an attachment mechanism configured for coupling the cover to the compact fluorescent lamp by engaging an inner surface of the compact fluorescent lamp. The attachment mechanism includes at least two resilient fingers for engaging at least two spaced apart inner surfaces of the compact fluorescent lamp.

16 Claims, 7 Drawing Sheets

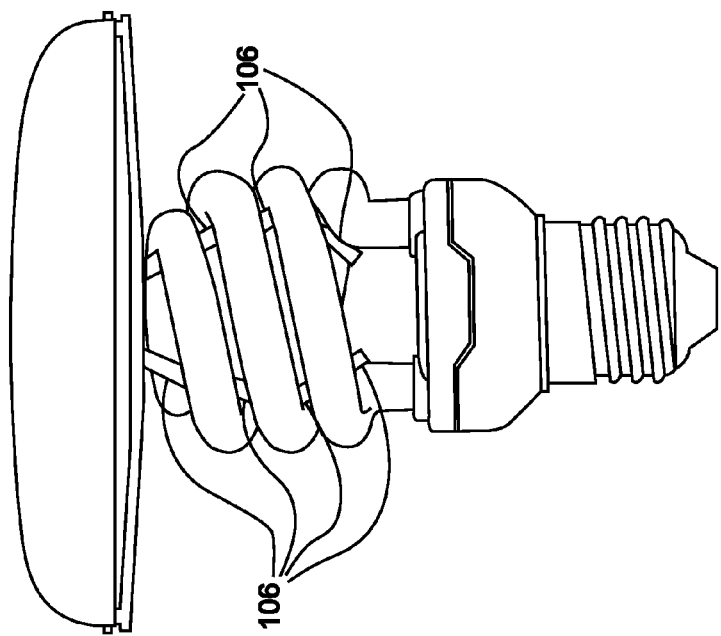
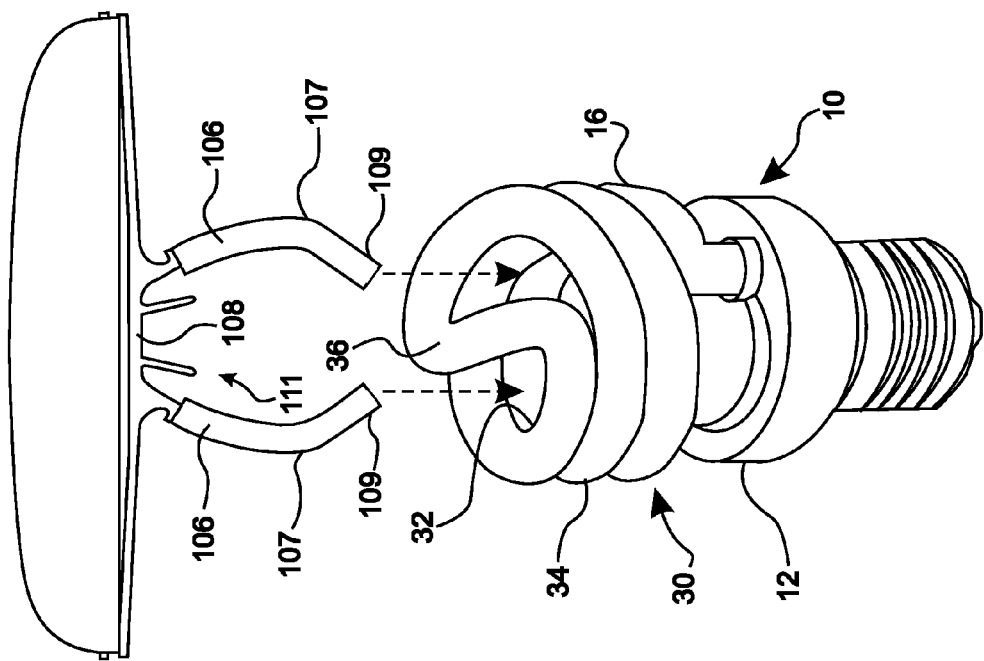
FIG. 3B
FIG. 3A

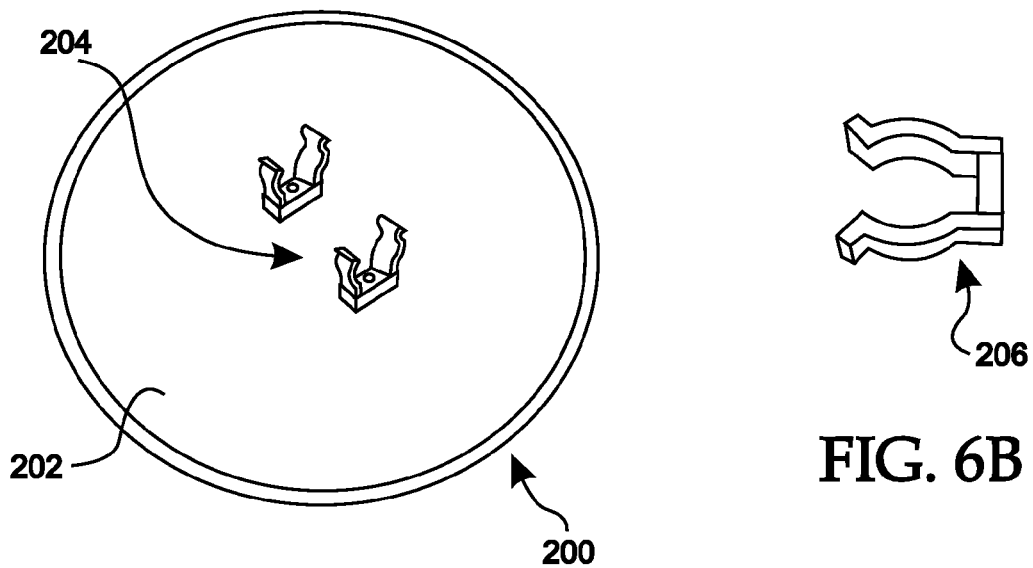
FIG. 6A
FIG. 6B
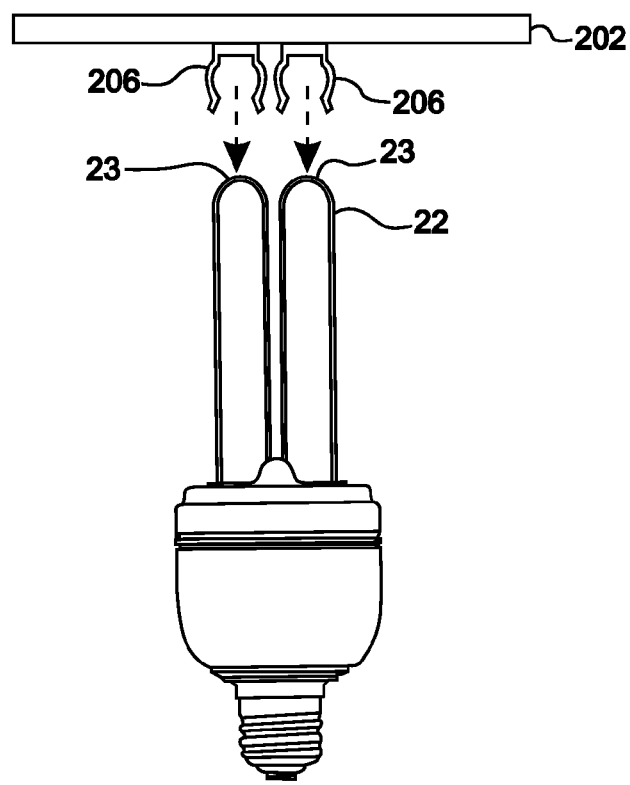
FIG. 6C

COVER DEVICE FOR COMPACT FLUORESCENT LAMPS

BACKGROUND

1. Field

The present disclosure relates generally to light bulbs and lamp assemblies, and more particularly, to a cover for a compact fluorescent lamp (CFL) which improves the aesthetic appearance of the compact fluorescent lamp while providing color and optical options not available in conventional compact fluorescent lamps.

2. Description of the Related Art

A compact fluorescent lamp (CFL), also known as a compact fluorescent light bulb, is a type of fluorescent lamp designed to replace an incandescent lamp. Many CFLs can fit in existing incandescent light fixtures. After 20 or more years of technology evolution, compact fluorescent lamps (CFLs) as shown in FIG. 1 are starting to be more widely used as replacements for incandescent bulbs due to their much greater energy efficiency.

The most common form of CFL is the spiral type shown in FIG. 1A. The spiral CFL 10 includes a base 12 configured for retaining the electronics necessary for the bulb. The base 12 further includes a connector 14 for coupling the spiral CFL 10 to a power source, e.g., a conventional socket of a lamp, also known as an Edison-type connector. The spiral CFL 10 includes a single fluorescent tube 16 wherein one end of the tube exits the base 12 spirals to a predetermined height and spirals down back into the base 12. Another common type of CFL is a biax or linear CFL 20 as shown in FIG. 1B. In the linear CFL configuration, the lamp includes at least one U-shaped fluorescent tube 22 coupled to the base 24. Several linear-type CFLs are commercially available which include one, two, three or more U-shaped fluorescent tubes.

However, CFL bulbs still have three main drawbacks: 1) CFLs do not have an aesthetically pleasing look, 2) CFLs are relatively expensive, and 3) the least expensive CFL bulbs often have very high color temperatures (e.g., cooler, bluer) than conventional incandescent bulbs.

To enhance the appearance of CFLs, standard spiral bulbs have been enclosed in a reflector/cover lens to attempt to replicate a standard reflector (R) or parabolic (PAR) type bulb more typically used in ceiling recessed ("high-hats") lighting (R30 and R40 standard sizes). One such reflector-type fluorescent lamp is disclosed in U.S. Pat. No. D532,124 to Iwase et al., a figure of which is reproduced here as FIG. 1C. However, for recessed lighting applications the reflector type CFL's are quite expensive, typically in the $6 to $7 range. In contrast, standard spiral type CFL's are now typically available in 4 packs for about $6 (or $1.50 apiece).

Thus, a need exists for a lower cost approach for enhancing the aesthetic appearance of CFLs. A further need exists for techniques for enhancing or changing the optical properties, e.g., color temperature, of conventional CFLs.

SUMMARY

A device for enhancing the appearance of a compact fluorescent lamp (CFL) and changing the optical properties of light emitted by the CFL is provided. The cover device of the present disclosure is a lower cost, yet aesthetically acceptable recessed CFL lighting solution for residential and commercial applications. The cover device of the present disclosure provides a low cost attachable cover or lens accessory to a standard spiral or linear CFL bulb to permit it to be used in recessed and other lighting applications, while greatly improving its aesthetic appearance. The techniques of the present disclosure will offer more color/decorative properties and options than a typical CFL PAR type lamp.

According to an aspect of the present disclosure, a device for a compact fluorescent lamp (CFL) is provided including a cover configured for obscuring the compact fluorescent lamp; and an attachment mechanism configured for coupling the cover to the compact fluorescent lamp by engaging an inner surface of the compact fluorescent lamp. The cover may be parabolic, curved or flat.

In another aspect, the attachment mechanism includes at least two resilient fingers for engaging at least two spaced apart inner surfaces of the compact fluorescent lamp.

In a further aspect, the attachment mechanism includes at least two feet members for coupling the attachment mechanism to the cover and the cover further comprises at least two diametrically opposed receiving members for receiving the at least two feet.

In yet another aspect, each of the at least two fingers includes a material for increasing the friction between each of the at least two fingers and the inner surface of the compact fluorescent lamp.

In another aspect, the attachment mechanism includes at least one clip member disposed between the at least two resilient fingers configured for engaging a cross member of the compact fluorescent lamp or at least one stabilizer member disposed between the at least two resilient fingers configured for engaging a top portion of the compact fluorescent lamp.

In a further aspect, the at least two fingers are disposed on an adjustable member configured for adjusting a distance of the cover from the compact fluorescent lamp.

In another aspect, the cover is a lens configured for diffusing light distribution from the compact fluorescent lamp. The cover may also be configured for changing the color temperature of light from the compact fluorescent lamp.

In yet a further aspect, the attachment mechanism includes at least one clip member configured for engaging a cross member of the compact fluorescent lamp. The at least one clip member may be rotatably coupled to the cover to accommodate spiral or linear type CFLs.

According to another aspect of the present disclosure, a lamp assembly is provided including a lamp including at least one spiral fluorescent tube defining a generally cylindrical volume having an inner surface and an outer surface; a cover configured for obscuring the lamp; and an attachment mechanism configured for coupling the cover to the lamp by engaging the inner surface of the cylindrical lamp.

In one aspect, the attachment mechanism includes at least two resilient fingers for engaging at least two spaced apart inner surfaces of the cylindrical lamp.

In a further aspect of the present disclosure, a lamp assembly includes a compact lamp including at least one U-shaped fluorescent tube; a cover configured for obscuring the lamp; and an attachment mechanism configured for coupling the cover to the lamp by engaging the at least one U-shaped fluorescent tube. In another aspect, the attachment mechanism includes at least one clip member configured for engaging a cross member of at least one U-shaped fluorescent tube.

BRIEF DESCRIPTION OF THE DRAWINGS

The above and other aspects, features, and advantages of the present disclosure will become more apparent in light of the following detailed description when taken in conjunction with the accompanying drawings in which:

FIG. 3A is an exploded view of a cover device of the present disclosure and a spiral type compact fluorescent lamp;

FIG. 3B is a side plan view of a cover device in accordance with the present disclosure mounted to a spiral type compact fluorescent lamp;

FIG. 6A is a perspective view of a cover device employing a snap-on attachment mechanism in accordance with an embodiment of the present disclosure;

FIG. 6B is a side plan view of a clip employed in the cover device of FIG. 6A; and FIG. 6C illustrates the mounting of the cover device shown in FIG. 6A to a linear type compact fluorescent lamp.

DETAILED DESCRIPTION

Figure 1A:
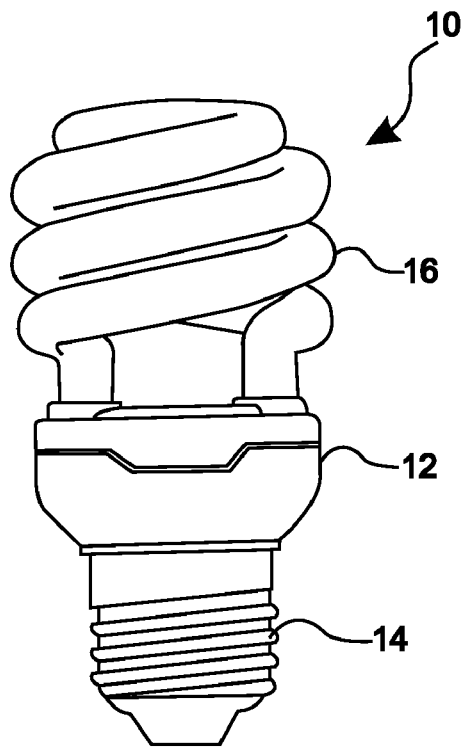
FIG. 1A is perspective view of a spiral type compact fluorescent lamp.
Figure 1B:
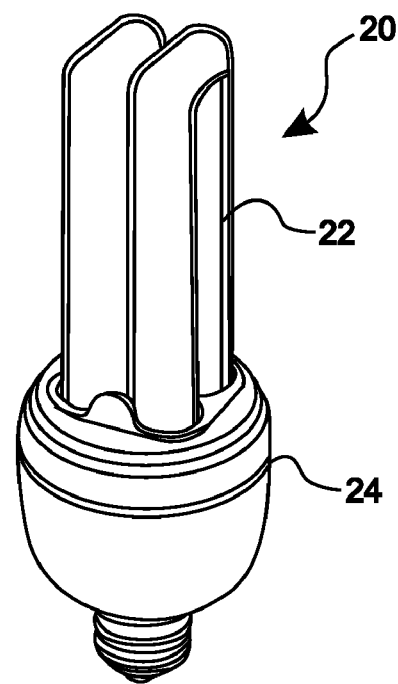
FIG. 1B is perspective view of a linear type compact fluorescent lamp.
Figure 1C:
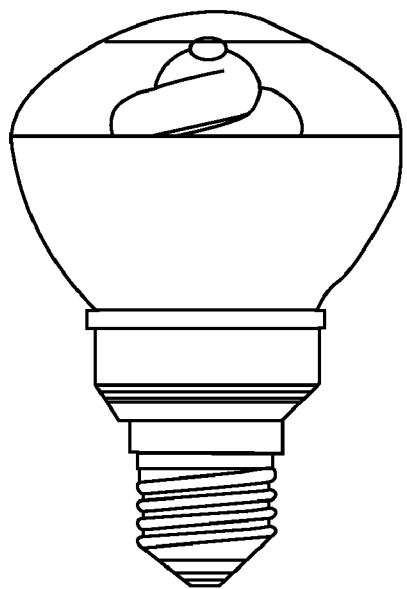
FIG. 1C is perspective view of a reflector type compact fluorescent lamp.

Preferred embodiments of the present disclosure will be described hereinbelow with reference to the accompanying drawings. In the following description, well-known functions or constructions are not described in detail to avoid obscuring the invention in unnecessary detail. Throughout the drawings, like reference numerals represent like elements.

A cover device for enhancing the appearance of a compact fluorescent lamp (CFL) and changing the optical properties of light emitted by the CFL is provided. The device of the present disclosure includes a family of parabolic, curved or flat lens covers that can be easily attached to a standard spiral or linear compact fluorescent light bulb. The cover of the device is configured to have a diameter matching standard PAR type incandescent lamps (e.g. R20, R30, PAR 38, R40, etc.) so that cover will fit into existing recessed lighting products made to accommodate these standard PAR or R bulb sizes. In use, a parabolic, curved or flat shape cover is selected depending on how far the CFL bulb is recessed into an existing fixture. If the bulb is fully recessed, a flat lens may be preferred, if the CFL bulb is slightingly protruding, a parabolic or curved lens may be preferred so that when viewed at an angle, the CFL bulb is still not visible in the gap between CFL lens and recessed fixture housing ("can").

Figure 2A:
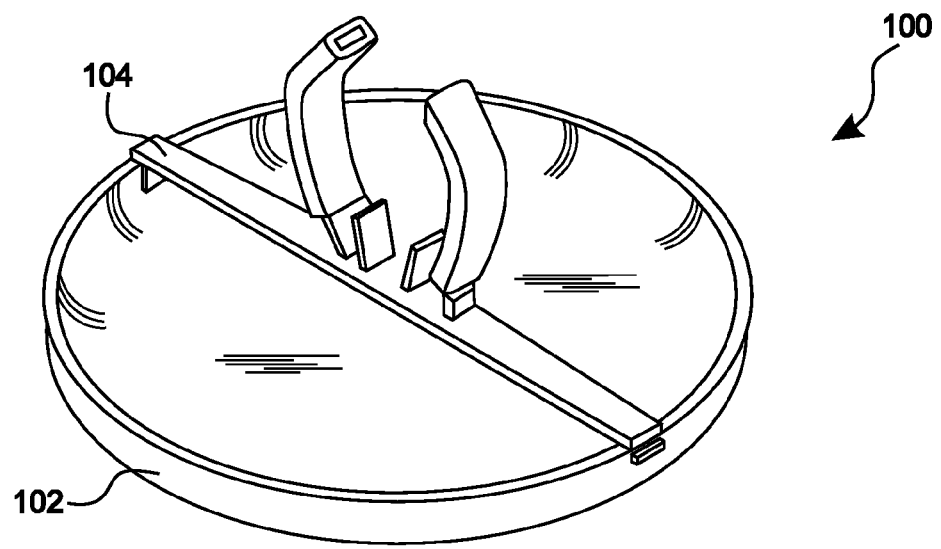
FIG. 2A is a perspective view of a cover device for a compact fluorescent lamp in accordance with the present disclosure.

Referring to FIG. 2A, a perspective view of the cover device 100 of the present disclosure is illustrated. The device 100 for a compact fluorescent lamp (CFL) includes a cover 102 configured for masking or obscuring the compact fluorescent lamp and an attachment mechanism 104 configured for coupling the cover 102 to the compact fluorescent lamp by engaging an inner surface of the compact fluorescent lamp. The attachment mechanism 104 is configured from a material to withstand the heat of the CFL bulb while making direct contact with a tube of the CFL bulb and that will minimally interfere with the light pattern and aesthetics. When attached to the CFL bulb, the device 100 will performs several functions: it hides the unsightly spiral of the CFL lamp, it diffuses the light, it can change the color or color temperature of the CFL lamp and it can provide other decorative features (e.g., lens patterns, colors, printed designs, etc.).

Figure 2B:
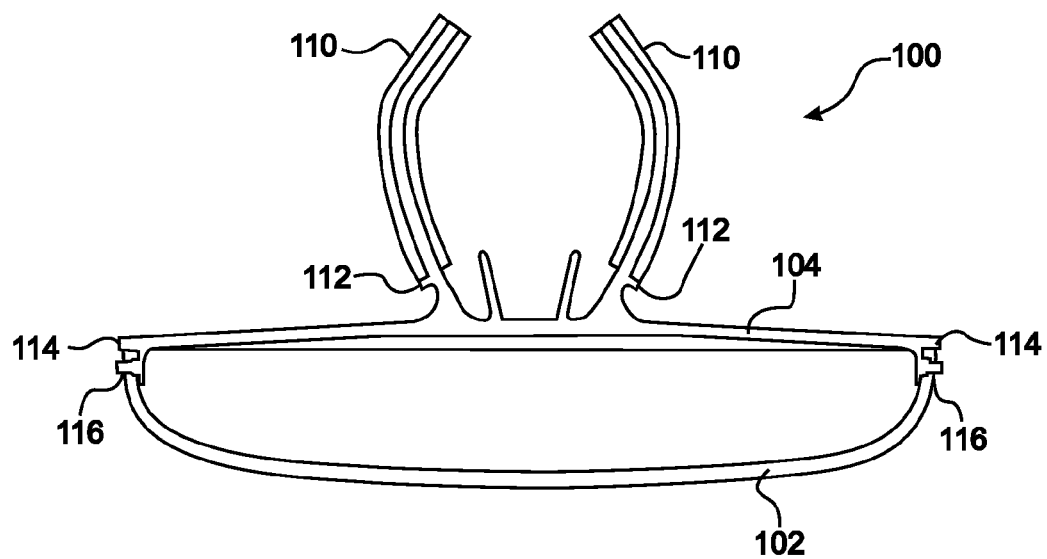
FIG. 2B is a cross sectional view of the cover device shown in FIG. 2A.
Figure 2C:
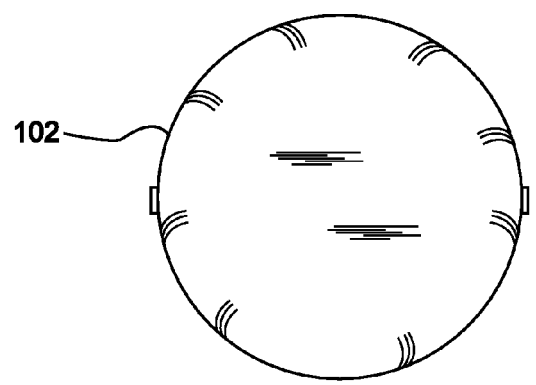
FIG. 2C is a bottom plan view of the cover device shown in FIG. 2A.

Generally, the device 100 includes cover 102 and attachment mechanism 104. A cross sectional view of the device 100 is shown in FIG. 2B with a bottom plan view of the cover 102 illustrated in FIG. 2C and a side view of the attachment mechanism 104 illustrated in FIG. 2D.

Referring to FIGS. 2A-D, the cover 102 is generally made of a plastic material that has diffusing properties to mask all or part of the CFL bulb from the user and to influence the CFL bulb's color properties and light distribution. It is to be appreciated that other materials made be used, e.g. glass, that have diffusing properties. An exemplary material for the cover is acrylic which has good optical properties, is UV resistant (i.e., won't yellow) and can sustain elevated temperatures. Other materials, such as polycarbonate with UV stabilizers could also be used. Preferably, the acrylic is not clear, but has an internal "bead" structure which diffuses light (e.g., gives a milky white appearance). This has the effect of visually "hiding" the CFL swirl look (making it look more like a "blob" or a standard bulb) and more widely distributing the light emanating from the CFL bulb. The lens material has an optical efficiency of 80% or greater in the preferred embodiment; however, the optical efficiency of the lens material may decrease if pigments are used to change the color of the light emitting from the bulb. Other diffusing properties, lens patterns and additional decorative details may be added or substituted.

The shape of the cover 102 is generally circular or disc-like and may be curved, parabolic or flat to best match the recessed fixture style and CFL bulb used. The cover will be configured in a number of diameters to match the PAR or reflective type incandescent size bulb being replaced (e.g. R20, R30, PAR38, R40 etc.). This will ensure compatibility with range of recessed fixtures on the market. It is to be appreciated that the cover may be configured as a generally cylindrical volume, e.g., having a cup-like shape, where the attachment mechanism is disposed in a lower, internal portion of the cylindrical volume and when coupled to the CFL, the cover substantially surrounds the entire CFL.

Furthermore, the cover 102 includes provisions, e.g., receiving members, for attachment of the attachment mechanism 104 that couples the cover to the CFL bulb, the details of which will be described in detail below in relation to FIG. 2E.

Figure 2D:
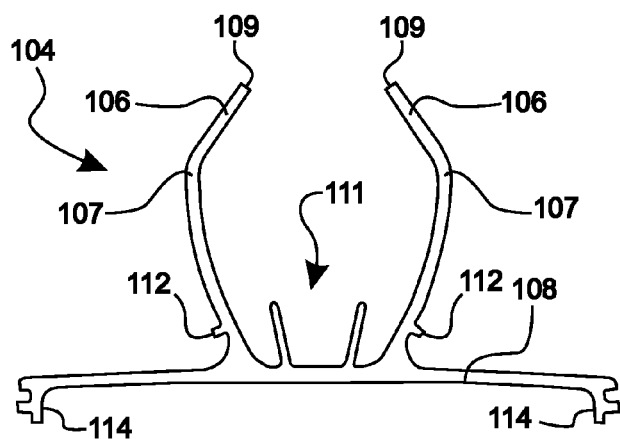
FIG. 2D is a side plan view of an attachment mechanism in accordance with the present disclosure.
Figure 2E:
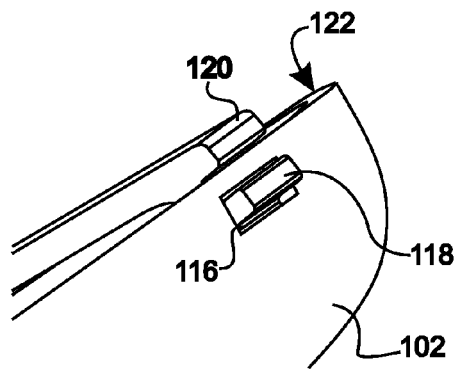
FIG. 2E is a partial view of an attachment mechanism engaging a cover in accordance with the present disclosure.

Referring to FIG. 2D, the attachment mechanism 104 includes two resilient fingers 106 for engaging an inner surface of a CFL and a cross member 108 for supporting the two fingers 106 and coupling the attachment mechanism 104 to the cover 102. The attachment mechanism 104 is configured so that the two fingers are flexible and can converge toward one another upon insertion into the center of CFL bulb and then produce a spring force pushing against at least two spaced apart inside surfaces of the bulb for retention. The attachment mechanism 104 is designed to be compatible with a range of CFL bulb sized (i.e., one size fits many).

To increase the retention strength of the attachment mechanism to the CFL, a material can optionally be applied to the two fingers 106. In one embodiment as shown in FIG. 2B, a sleeve 110 made of silicone material is fitted to the fingers 106 that increases the friction and holding strength of the fingers 106 against the glass tube of the CFL bulb. It is to be appreciated that the material to increase friction can be an overmold, a snap-on, a glued or taped silicone foam or can be applied by any other known method. In the embodiment which employs a sleeve, a detent 112 is provided on a lower end of each of the two resilient fingers 106 to hold the sleeve 110 in place. In a further embodiment instead of applying a material to the fingers, the outer surface of the two resilient fingers can be formed with gripping notches which will increase the friction between the fingers and the tube of the bulb.

The attachment mechanism 104 further includes feet members 114 on each end of the cross member 108 for coupling the attachment mechanism 104 to the cover 102. As shown in FIG. 2B, the cover 102 includes two diametrically opposed opening or apertures 116 or receiving members for receiving the feet members 114. Referring to FIG. 2E, the feet members 114 are configured to positively engaged the cover 102 by including a first portion 118 that is inserted into the aperture 116 and a second portion 120 that interacts with an upper lip 122 of the cover 102, thereby locking the attachment member 104 into the cover 102. It is to be appreciated that the cross member 108 will be flexible enough to allow an end user to insert the feet members 114 into the cover without any equipment. This simplifies product packaging and gives the flexibility of providing two or more different length attachment mechanisms with each cover to conform to varying installations, if necessary.

In use, the device 100 of the present disclosure will be coupled to a compact fluorescent lamp by engaging an inner surface of the CFL. Referring to FIG. 3A, a spiral CFL similar to the CFL shown in FIG. 1A is illustrated. As described above, the spiral CFL 10 includes a single fluorescent tube 16 wherein one end of the tube exits the base 12 spirals to a predetermined height and spirals down back into the base 12. The tube 16 defines a generally cylindrical volume 30 having an inner surface 32 and an outer surface 34. To couple the device 100 to the CFL 10, the two fingers 106 are aligned to be inserted into the interior of the volume 30 as indicated by the dashed arrows. The fingers 106 are configured with at least one deflection point 107 so the free ends 109 of the fingers 106 enter the interior of the volume 30 without the user physically touching the fingers 106. If necessary, the fingers 106 may be squeezed toward each other so the free ends 109 enter the interior of the volume. The cover 102 of the device 100 is then pushed toward the CFL and the fingers 106 are compressed toward each other while exerting a spring force outwardly toward the inner surface 32 of the volume 30. The fingers 106 are slid into the interior of the volume until the cross member 108 makes contact with a cross bar portion 36 of the spiral tube 16. In one embodiment, the cross member 108 will further include a stabilizer member 111 which will straddle the cross bar portion 36 of the tube 16.

Figure 4B:
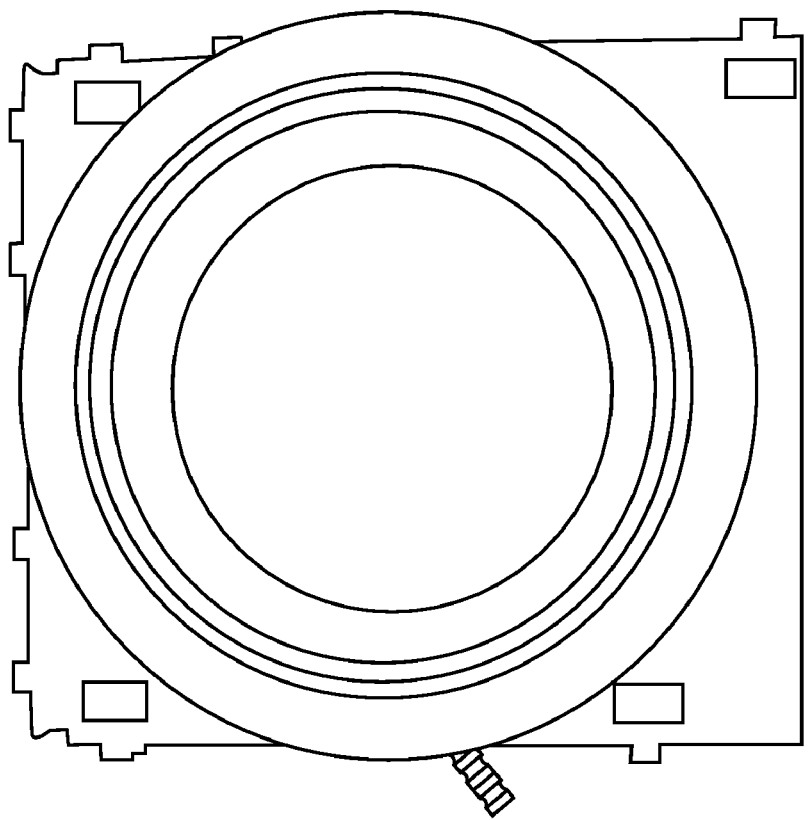
FIG. 4B is a top plan view of the recessed lighting fixture with a cover device of the present disclosure mounted to the spiral type compact fluorescent lamp.
Figure 4A:
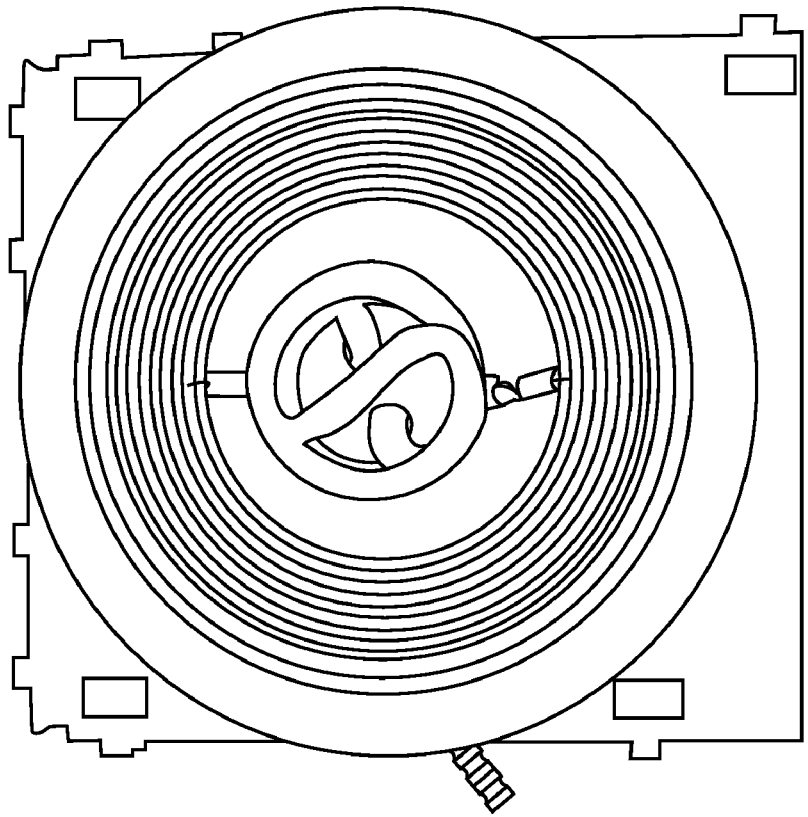
FIG. 4A is a top plan view of a spiral type compact fluorescent lamp mounted in a recessed lighting fixture.

The resulting lamp assembly including the cover device 100 positioned on the CFL is illustrated in FIG. 3B. As can be seen in FIG. 3B, the fingers 106 exert an outward spring force against the inner surface of the volume 30 to retain the device 100 on the CFL. The device 100 of the present disclosure will enhance the appearance of the light bulb or fixture as seen by a user. Referring to FIG. 4A, a spiral CFL is disposed in a recessed lighting fixture, e.g., a high hat or can, where the spiral tube and other components of the recessed fixture, e.g., springs, are exposed to the user. By utilizing the device of the present disclosure, the spiral CFL and inner components of the recessed lighting fixture are hidden to the user, as shown in FIG. 4B. When in place, the lamp assembly of the present disclosure resembles a PAR or Reflector type light bulb at a significantly reduced cost.

The lens or cover 102 of the device 100 first diffuses light passing through it in a manner that obscures the light source and other objects including the attachment mechanism behind it. The complete lamp assembly therefore looks more uniform in appearance as with a standard frosted incandescent Reflector bulb, as typically used in recessed lighting. In addition, pigments may be added to the lens material (e.g., acrylic) of the cover 102 to filter out selected light wavelengths. This can have the affect of changing the white color temperature (i.e., along the Black Body Locus (BBL) of 1931 CIE color chart), either higher or lower. Furthermore, the pigments can create a color "tint" moving color point off of the BBL. For example, in a restaurant, often recessed incandescents bulbs have red dye, filter or paint on the front lens to increase red content (lessen/filter blue, green content) and make foods look more appealing. This can also be done with the lens cover of the present disclosure. Amber pigment can be added to the cover 102 to make higher (blue) color temperature CFL's look more "warm" (filters out more blue/green). The lens properties may also be non-homogeneous from the center of the cover 102 out to change the lighting distribution characteristics (e.g., less diffuse in center, more diffuse on edges). Special decorative features can be added, for example, molded in or painted on. Also, shapes (e.g., letters, logo, etc.) can be molded in a surface of the cover to create special lighting effects on room surfaces.

Figure 5A:
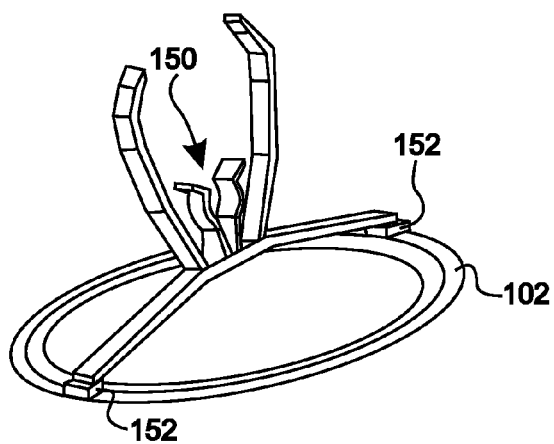
FIGS. 5A-D are perspective views of alternative embodiments of the cover device in accordance with the present disclosure.
Figure 5B:
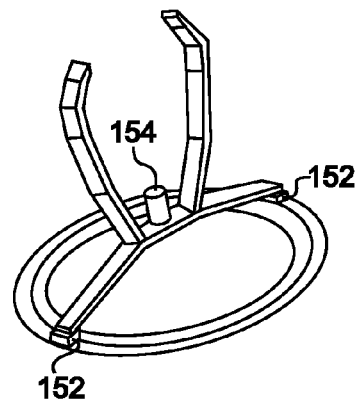
Figure 5C:
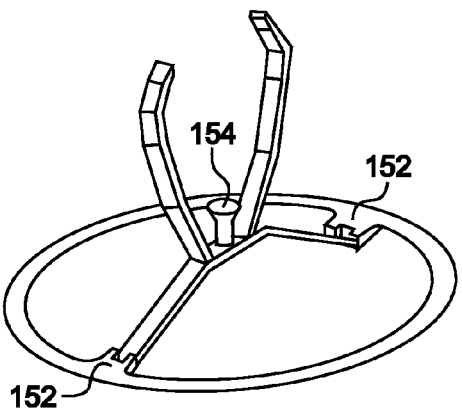

The device of present disclosure contemplates other configurations for the cover and attachment mechanism than those shown in FIGS. 2A through 2E. Several possible configurations for the device 100 of the present disclosure are shown in FIGS. 5A-D. In FIG. 5A, the stabilizer member is configured as a clip 150 to positively engage the cross bar portion 36 of a spiral CFL. Furthermore, the cover 102 is flat and therefore does not include apertures 116 but includes receiving members 152 diametrically disposed on an outer edge of the cover 102. The devices shown in FIGS. 5B and 5C includes a stop members 154 which will come into contact with the cross bar portion 36 of the CFL to prevent further insertion of the device. Furthermore, FIGS. 5B and 5C illustrates different receiving members 152 where FIG. 5B illustrates an embodiment where the feet members are vertically inserted into receiving members 152 and in FIG. 5C, the feet members are slid into receiving members 152.

Figure 5D:
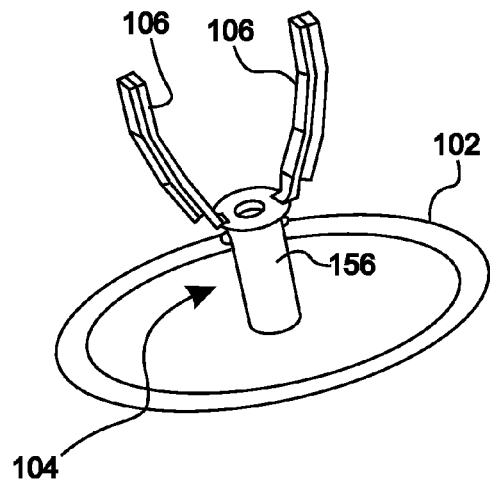

Referring to FIG. 5D, the attachment mechanism 104 includes two resilient fingers 106 mounted on a telescoping mechanism 156 to adjust the height of the cover 102 (up or down) away from the CFL. The telescoping mechanism 156 can be a threaded mechanism that gets longer as it is unscrewed or using an engagement pin or detent as it is pulled out or pushed in.

Referring to FIG. 6A, another embodiment of the cover device 200 in accordance with the present disclosure is illustrated. The device 200 includes a cover 202 similar to the cover described above and a snap-on attachment mechanism 204 to attach to the top cross bar portion 36 of a conventional CFL bulb. The snap-on attachment mechanism 204 includes at least one clip as shown in FIG. 6B. Preferably, the clips 206 are constructed from plastic and are transparent. The clips 206 are molded in, bonded to or clipped into anchor points on the cover 202. Furthermore, the attaching clip 206 could be threaded or telescoping to allow it to adjust the distance of the retaining clips to the cover. This will allow adjustments to optimize the installation based on which type of CFL is used and depth of recessed fixture.

The attachment clip 206 shown in FIG. 6B, is configured to clip directly to the CFL center cross bar portion. These clips are configured to be flexible and automatically adjust to the diameter of the CFL cross bar portion or tube, so only one clip version is necessary for all or most of the CFL manufacturers and styles. The user would clip the cover to the CFL bulb either before or after installation in the recessed fixture.

In a further embodiment, the clips 206 will be rotatably mounted to the cover 202 to accommodate linear type CFL bulbs, as well as spiral type CFL. In a first position as shown in FIG. 6A, the clips are positioned to engage a cross bar portion of a spiral type CFL. The clips 206 may then be rotated to a second position as shown in FIG. 6C. In this position, the device 200 can be coupled to a linear type CFL that has two U-shaped tubes. Referring to FIG. 6C, a linear type CFL has at least one U-shaped tube 22 with an upper potion 23 that is perpendicular to the longitudinal orientation of the CFL. With the clips 206 in the second position, the device 200 can accommodate a linear type CFL.

A cover device for a compact fluorescent lamp has been provided. The CFL cover is intended to be sold as a CFL bulb accessory and is expected to have a retail price of about $1 to $3, thus a complete recessed CFL lighting solution will be in the $2.50 to $4.50 range. This is much less expensive (less than half the cost) than the PAR or R type CFL products being offered today.

While the disclosure has been shown and described with reference to certain preferred embodiments thereof, it will be understood by those skilled in the art that various changes in form and detail may be made therein without departing from the spirit and scope of the disclosure.

What is claimed is:

1. A device for a compact fluorescent lamp (CFL), the compact fluorescent lamp including a base and a single, spiral fluorescent tube defining a generally cylindrical volume having an inner surface and an outer surface, the device comprising:
    a cover configured for obscuring the compact fluorescent lamp; and
    an attachment mechanism extending from the cover for retaining the cover to the compact fluorescent lamp, the attachment mechanism is attached to and directly supported by the inner surface of the single, spiral fluorescent tube so all of the cover and attachment mechanism are at locations spaced from the base.

2. The device as in claim 1, wherein the attachment mechanism includes at least two resilient fingers for engaging at least two spaced apart inner surfaces of the compact fluorescent lamp.

3. The device as in claim 2, wherein the attachment mechanism includes at least two feet members for coupling the attachment mechanism to the cover and the cover further comprises at least two diametrically opposed receiving members for receiving the at least two feet.

4. The device as in claim 2, wherein each of the at least two fingers includes a material for increasing the friction between each of the at least two fingers and the inner surface of the compact fluorescent lamp.

5. The device as in claim 2, further comprising at least one clip member disposed between the at least two resilient fingers configured for engaging a cross member of the compact fluorescent lamp.

6. The device as in claim 2, further comprising at least one stabilizer member disposed between the at least two resilient fingers configured for engaging a top portion of the compact fluorescent lamp.

7. The device as in claim 2, wherein the at least two fingers are disposed on an adjustable member configured for adjusting a distance of the cover from the compact fluorescent lamp.

8. The device as in claim 1, wherein the cover is parabolic, curved or flat.

9. The device as in claim 1, wherein the cover is a lens configured for diffusing light distribution from the compact fluorescent lamp.

10. The device as in claim 1, wherein the cover is a lens configured for changing the color temperature of light from the compact fluorescent lamp.

11. The device as in claim 1, wherein the attachment mechanism includes at least one clip member configured for engaging a cross member of the compact fluorescent lamp.

12. The device as in claim 11, wherein the at least one clip member is rotatably coupled to the cover.

13. A lamp assembly comprising:
    a lamp including a base and at least one spiral fluorescent tube exiting a surface of the base spiraling to a predetermined height and spiraling back into the surface of the base, the at least one fluorescent tube defining a generally cylindrical volume having an inner surface and an outer surface;
    a cover configured for obscuring the lamp; and
    an attachment mechanism extending from the cover for retaining the cover to the lamp, the attachment mechanism is attached to and directly supported by the inner surface of the at least one spiral fluorescent tube and retaining the cover to an end of the at least one spiral tube opposite the base so all of the cover and attachment mechanism are at locations spaced from the base.

14. The assembly as in claim 13, wherein the attachment mechanism includes at least two resilient fingers for engaging at least two spaced apart inner surfaces of the cylindrical lamp.

15. The assembly as in claim 14, wherein the at least two fingers are disposed on an adjustable member configured for adjusting a distance of the cover from the cylindrical lamp.

16. The assembly as in claim 13, wherein the cover is a lens configured for altering at least one optical property of the light emitted from the cylindrical lamp.

\* \* \* \* \*